United States Patent [19]
Tamamura et al.

[11] 3,830,054
[45] Aug. 20, 1974

[54] LINK CHAINS FOR MOTOR BLOCKS
[75] Inventors: Takeo Tamamura, Hitachi-shi; Saburou Nemoto, Mito-shi; Takeshi Tokunaga, Hitachi-shi; Tadashi Nemoto, Tokyo, all of Japan
[73] Assignee: Hitachi, Ltd., Tokyo, Japan
[22] Filed: Sept. 21, 1971
[21] Appl. No.: 182,329

[52] U.S. Cl................... 59/84, 148/16.5, 148/31.5
[51] Int. Cl........................ F16g 13/06, C23c 11/12
[58] Field of Search .......... 148/12.1, 15.5, 16.5, 19, 148/31.5, 39; 59/1, 3, 35, 78, 84

[56] References Cited
UNITED STATES PATENTS

| 522,247 | 7/1894 | Wilson | 148/12.1 |
| 594,009 | 11/1897 | Harrington | 148/12.1 |
| 1,127,072 | 2/1915 | Morse | 148/12.1 |
| 1,551,764 | 9/1925 | Muller | 148/19 |
| 1,739,522 | 12/1929 | Reyburn | 59/84 X |
| 2,745,776 | 5/1956 | Grange et al. | 148/19 |
| 3,136,664 | 6/1964 | Kuntzmann | 148/16.5 X |
| 3,227,586 | 1/1966 | Spencer | 148/16.5 X |

FOREIGN PATENTS OR APPLICATIONS

| 1,039,548 | 9/1958 | Germany | 148/16.5 |
| 557,739 | 6/1957 | Belgium | 59/84 |

OTHER PUBLICATIONS
Alloy Digest, Filing Code SA 66, Feb. 1958.
Metals Handbook, 1964, ed. pages 253–256.

Primary Examiner—Charles N. Lovell
Attorney, Agent, or Firm—Craig & Antonelli

[57] ABSTRACT

A link chain for use in motor blocks which is made up unit links each made of steel consisting of 0.10–0.26 percent by weight of C, 0.10–0.35 percent by weight of Si, 0.50–1.40 percent by weight of Mn, 0.2–0.7 percent by weight of Ni, up to 0.9 percent by weight of Cr, up to 0.5 percent by weight of Mo, up to 0.01 percent by weight of B, up to 0.35 percent by weight of P, up to 0.03 percent by weight of S and the remainder of Fe, and having the carburized surface layer of a depth of 1/80–1/25 of the diameter of a rod constituting the unit link wherein the C concentration in said layer is from 0.6 to 0.8 percent by weight.

6 Claims, 3 Drawing Figures

PATENTED AUG 20 1974

INVENTORS
TAKEO TAMAMURA,
SABUROU NEMOTO,
TAKESHI TOKUNAGA AND
TADASHI NEMOTO

BY Craig, Antonelli & Hill
ATTORNEYS

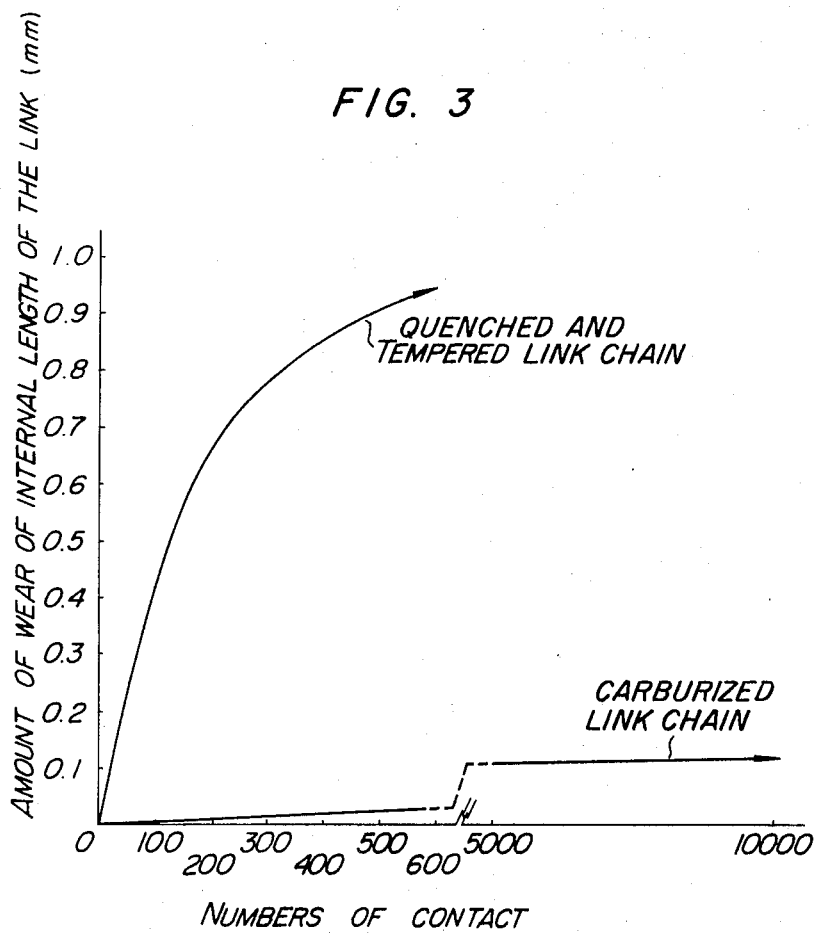

LINK CHAINS FOR MOTOR BLOCKS

BACKGROUND OF THE INVENTION

1. Field of the Invention

This invention relates to link chains for motor blocks comprising a motor and a link chain moved vertically by said motor.

2. Description of the Prior Art

Motor blocks are high in hoisting speed, therefore, the link chains used therein are subjected to greater impact loads.

It is, therefore, the essentail requirements for the link chains that they will not be susceptible to impact rupture under any operational conditions and will not be susceptible to fatigue rupture under repeated loads imposed thereon. For this reason, in the specifications relating to the constructions of cranes the rupture strength of this type of link chain is specified to be at least five times the rated load. On the other hand, the fatigue strength is required to be at least 1.3 times the rated load. In addition, the link chains are required to have excellent wear-resistance so as to be usable over an extended period of time.

The wear-resistance of a link chain should be determined in the relation between the wear limit represented by the point when the internal length of the link becomes 5 percent longer and the wear limits of the component parts of the associated motor block, e.g. a sprocket. However, in the light of the fact that the motor is usually started and stopped several times during one winching operation, i.e., during the period of time in which the link chain engages once with the sprocket, and assuming from the past experience of using the wire ropes of hoists or cranes, it is desirable that the link chain is durable with 30–50 thousands of contact. Besides the conditions set forth above, the link chain is also desired to satisfy the following general:

1. Uformity with respect to both dimensions and strength.

Since the link chain is produced by bending a rod material and welding the opposed ends thereof with each other, it is susceptible to dimensional change and tends to become unstable with respect to the strength thereof. Therefore, the above changes of the material should be as small as possible even when the mechanical and thermal affections are applied thereto.

2. Good weldability.

In order to eliminate the defects and prevent the breakage of the welded portion, materials are required to have good weldability so as to minimize the irregularity of rupture strength.

3. Good hardenability.

The link chain is subjected to a heat treatment so as to improve the strength and wear resistance thereof. In this case, it is desirable that the link chain is hardened uniformly to the center thereof.

4. Small size.

This is necessary to render the entire motor block small in size and operable with a small radius of curvature. To this end, the link chain must have large strength and good wear resistance.

As the best link chain satisfying these conditions, one made of a low manganese steel has been used heretofore. This low manganese steel consists of 0.21–0.25 percent by weight of C, 1.10–1.40 percent by weight of Mn, 0.10–0.30 percent by weight of Si, less than 0.035 percent by weight of P, less than 0.035 percent by weight of S and the remainder of Fe and trace amounts of impurities which are inevitably contained in the steel. In the past, the low manganese steel of the composition described above fabricated into the shape of a link chain has been quenched and tempered to bring the hardness of the unit link in the Hv hardness range from 410 to 473 (the $H_{RC}$ hardness range from 42–47) in relation with the strength thereof. It has been known that the low manganese steel link chains thus produced, when the diameter of the rod constituting the unit link is 8 mm, have on an average a rupture strength of 8 tons or greater and a fatigue strength of 1.3 tons or greater, and exhibit sufficiently satisfactory performance.

However, the wear resistances of these link chains have not necessarily been satisfactory. Namely, the wear of the unit link of the link chain due to engagement with the sprocket does not substantially proceed once it has been worn out to some extent to fit the sprocket, but the increase of the internal length of the unit link due to wear is caused by the sliding frictional engagement with the adjacent unit links and the internal length becomes progressively larger in proportion to the number of contact, and at the same time, the abraded surface becomes progressively rougher and larger in area.

Further the rate of wear is largely variable depending upon the presence or absence of lubricant and the amount of wear in a lubricated condition is about 1/50–1/100 of that in a dry condition. However, considering the way and the environmental conditions in which the link chain is used, it is practically impossible to keep the link chain lubricated, and thus there remains the problem that the low manganese steel link chain is unsatisfactory in resistance to wear when unlubricated.

SUMMARY OF THE INVENTION

A principal object of the present invention, therefore, is to provide a novel link chain adapted for use in motor blocks.

Another object of the invention is to provide a link chain having high resistance to wear.

Still another object of the invention is to provide a link chain adapted for use in motor blocks the rated loads of which are not larger than 2 tons.

These objects can be achieved by making the unit links of the chain link of a steel material consisting essentially of 0.10–0.26 percent by weight of C, 0.10–0.35 percent by weight of Si, 0.50–1.40 percent by weight of Mn, 0.2–0.7 percent by weight of Ni, up to 0.9 percent by weight of Cr, up to 0.5 percent by weight of Mo, up to 0.01 percent by weight of B, less than 0.035 percent by weight of P, less than 0.035 percent by weight of S and the remainder of Fe, and subjecting the unit links to carburizing such that the C concentration in the surface layer having a depth of 1/80–1/25 of the diameter of the unit link-constituting steel rod falls in the range from 0.6 to 0.8 percent by weight.

The present inventors conducted a study with the idea that the wear of the link chain which is caused by friction between the adjacent unit links could be minimized by increasing the hardness of the contacting portions of the unit links, and consequently found that case hardening is effective for the prevention of the wear.

It was also found that the depth of the case-hardened surface layer of the unit link, and the carbon concentration and hardness of said layer have a large influence on the strength of the entire unit link. However, case hardening is usually carried out so as to obtain a carbon concentration higher than that at the eutectoid point (a carbon concentration of 0.85 percent) in the Fe-C phase diagram, and it was confirmed that when the link chain of the chemical composition described above is subjected to carburizing based on this concept, the surface hardness of the link chain can be increased to a Hv hardness of 700 or higher but, on the other hand, the rupture strength thereof is substantially degraded. The reason for this may be explained as follows: Namely, when the link chain is pulled, the stress distribution shows that the maximum stress is located on the inside of the R portion (usually called shoulder) of the link. This is a bending stress in consideration of the direction of the load. However, the bending strength of a given material varies depending upon the hardness and, in general, the bending strength decreases as the hardness becomes abnormally large. Here, the present inventors found that the bending strength and the amount of deflection are in substantially parallel relation to each other and a material having high toughness has also large bending strength.

Furthermore, the above-mentioned R portion is susceptible to micro defects, cracks and wrinkles at the surface thereof during working, and the possibility of these defects propagating under stress is greater when the material is harder and lower in toughness. A strength reduction of the link chain is caused by these two facts. Therefore, the present inventors confirmed that for imparting wear-resistance to the link chain, it is inappropriate to arbitrarily increase the surface hardness and it is desirable to make the carbon concentration low at the time of case hardening to such an extent as will not impair the wear-resistance.

It was also confirmed that the depth of the case-hardened surface layer must be in a certain ratio to the diameter of the unit link-constituting steel rod because too a large depth renders the unit link brittle as a whole. On the other hand, the strength of the rupture link chain is related with the magnitude of the bending load applied in the bending test as stated above, and it was found that the strength of the link chain increases with the bending strength or, in other words, the toughness of the case-hardened surface layer is important for increasing the strength of the hardened link chain. Practically, it was revealed that when the unit link is case-hardened by carburizing such that the hardened surface layer has a carbon concentration of 0.7 percent and a Hv hardness of 600, and the depth of said hardened layer is 1/80–1/25 of the diameter of the unit link-constituting steel rod, said unit link shows a tensile strength of about 6 tons or greater and a fatigue strength of about 1.5 tons or greater which are equivalent to those of tempered low manganese steel, and also shows wear-resistance which is far superior to that of the tempered low manganese steel (the Hv hardness of which is in the range from 410 to 473).

The subsequent study also revealed that although the carbon concentration of the hardened surface layer is most preferably 0.7 percent by weight, the hardened unit link retains a rupture strength of 6 tons and a fatigue strength of 1.5 tons and also has a Hv hardness of 513 (Rc hardness of 50) when the carbon concentration of the hardened surface layer is in the range of $\pm$ 0.1 percent by weight of the value specified above.

There is a slight difference in respect of C and Mn concentrations between the conventionally used low manganese steel and the material of which the link chain of the present invention is made, and the concentration ranges of C and Mn are wider in the latter than in the former. This is because, since in the present invention the wear-resistance of the surface layer of the unit link is increased by the case hardening, it is unnecessary to increase the hardness of the inner layer and it is rather preferable to retain the high toughness of the inner layer so as to increase the breaking strength of the entire unit link.

The depth of the hardened surface layer is determined with a view to securing the strength and wear resistance of the link chain, and the upper limit thereof is 1/25 of the diameter of the unit link-constituting steel rod because a larger depth will result in a strength degradation of the inner layer, and the lower limit thereof is 1/80 because a smaller depth will result in a degradation of wear-resistance of the surface layer.

By the way, the diameter of the unit link-constituting steel rod is desirably as small as possible by reason of economy as well as easiness of hardening of the steel rod up to the center thereof. The chain links which are used at the present time in motor blocks of 1 ton in rated load, have diameters larger than 8 mm, and those used in motor blocks of 2 tons in rated load have diameters larger than 9.5 mm.

The present inventors found that a steel material consisting of 0.10–0.26 percent by weight of C, 0.10–0.35 percent by weight of Si, 0.50–1.40 percent by weight of Mn, less than 0.035 percent by weight of P, less than 0.035 percent by weight of S and the remainder of Fe, when incorporating Ni, Cr and/or Mo, has improved wear-resistance.

Namely, by incorporating Ni, Cr and Mo in said steel material, the hardenability of the material can be improved and the wear-resistance thereof imparted thereto by a case hardening can be improved. In order to increase the hardness without degrading the rupture strength, it is necessary to enhance the toughness of the hardened surface layer and the inner layer, and in this respect, Ni, Cr and/or Mo bring about a great effect in the aforesaid steel material.

Improvement only in the hardenability can be achieved by incorporating Ni singly, but in this case the incorporation of 5 percent of Ni which may bring about the same effect as obtainable by incorporating Ni, Cr and/or Mo in a total amount of 1–2 percent, is unsatisfactory from the economical point of view. The incorporation of Ni, Cr and Mo in the present invention also aims to enhance the economy of the link chain. Ni, Cr and Mo serve to improve the hardenability of the unit link and to enhance the toughnesses of the hardened structure and the carburized surface layer as stated above, but in addition, Cr and Mo singly serve to increase the strength and Ni singly serves to improve the toughness of the unit link.

The above-described effects of Ni, Cr and Mo can be obtained when the total amount thereof is 0.5 percent or larger. The incorporation of these elements in excess of 2.0 percent in total amount is not substantially effective.

Mo and Cr may be incorporated each in an amount sufficient to increase the strength of the unit link and Ni may be incorporated in an amount sufficient to improve the toughness of the same. Specifically, Mo is incorporated in an amount at least 0.10 percent but up to 0.50 percent, Cr in an amount at least 0.20 percent but up to 0.90 percent, and Ni in an amount at least 0.20 percent but up to 0.70 percent.

The steel material of the composition set forth above, when subjected to carburizing, gives a surface hardness of the unit link of Hv 600 or greater and a rupture strength of 8 tons or greater when the diameter of the unit link-constituting steel rod is 8 mm.

The present inventors also found that by incorporating B with the above steel, strength of the rod can also be remarkably improved. In this case, the Mn concentration range is specified to be from 0.50 to 0.90 percent by weight because, when Ni, Cr, Mo and B are incorporated, the wear resistance of the unit link can be improved by carburizing but the toughness thereof tends to be degraded, and such tendency can be prevented by incorporating Mn in the concentration range specified above. The link chain made of this material has a rupture strength of 10 tons or greater and is sufficiently usable in motor blocks of 2 tons in rated load, provided that the diameter of the unit link rod is 9.5 mm. B is added for the purpose of improving the hardenability and to increase the wear resistance of the unit link and the strength of the inner layer of said unit link, and the mount thereof may be as small as the presence thereof in the steel can be recognized. Practically, the presence of as small as 0.001 percent is sufficiently effective. However, the amount of B should not exceed 0.010 percent because if the amount is larger than 0.010 percent, excessive hardening of the inner layer of the unit link will result and the toughness of the hardened structure will be undesirably degraded.

The steel material of the composition set forth above gives a surface hardness of Hv 500 or greater and a rupture strength of 6 tons or greater to the unit link made thereof, when subjected to carburizing.

A preferable carburizing process comprises:

a. heating the unit link for 30 minutes at 850° C in a suitable carburizing atmosphere, such as gas atmosphere, and cooling the hardened unit link in an oil, or b. heating the unit link for 30 minutes at 850° C in a suitable carburizing atmosphere and then tempering the hardened unit link at 170°–200° C in a salt bath.

In the practical operation of the process, the heating temperature is maintained at 850° ± 20° C and the heating time should be adjusted by shortening it where the temperature is higher or by extending it where the temperature is lower than that specified above.

Water quenching may be employed in lieu of the oil quenching.

The depth of the hardened layer and the carbon concentration of the same are variable depending upon the carburizing conditions, but the intended effective depth and carbon concentration can be obtained by carrying out carburizing under the conditions set forth above.

BRIEF DESCRIPTION OF THE DRAWING

FIG. 3 is a graph showing the wear-resistances of a quenched and tempered low manganese steel-made link chain and the link chain according to the embodiment of the invention in terms of the relationship between the number of contact and the amount of wear of the internal length of the link.

DESCRIPTION OF THE PREFERRED EMBODIMENTS

Figure 1:
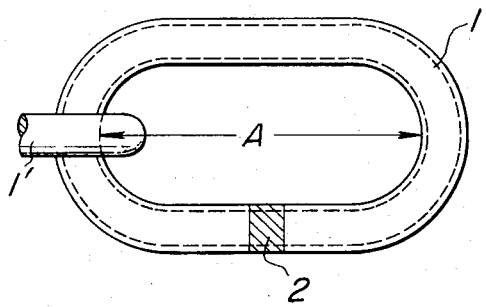
FIG. 1 is a view showing the configuration of the unit links of the link chain for motor blocks according to the present invention.

Referring to FIG. 1 there is shown the configuration of the unit link in the link chain. Numeral 1 designates the unit link, 2 a welded portion and 3 a carburized layer, and character A designates the internal length of the unit link.

Theoretically, the carburization need only be effected at the contacting surfaces of the unit links but this is technically difficult. Therefore, in practice the portion indicated by the dotted line in FIG. 1 may be carburized.

The depth of the carburized layer which is specified in the present invention to be 1/25–1/80 of the diameter of the unit link-constituting steel rod, refers to the depth of said layer on one side of the unit link, particularly to the depth of the carburized layer on the inner side of the unit link.

The present invention will be further illustrated by way of example hereunder:

Example 1

Figure 2:
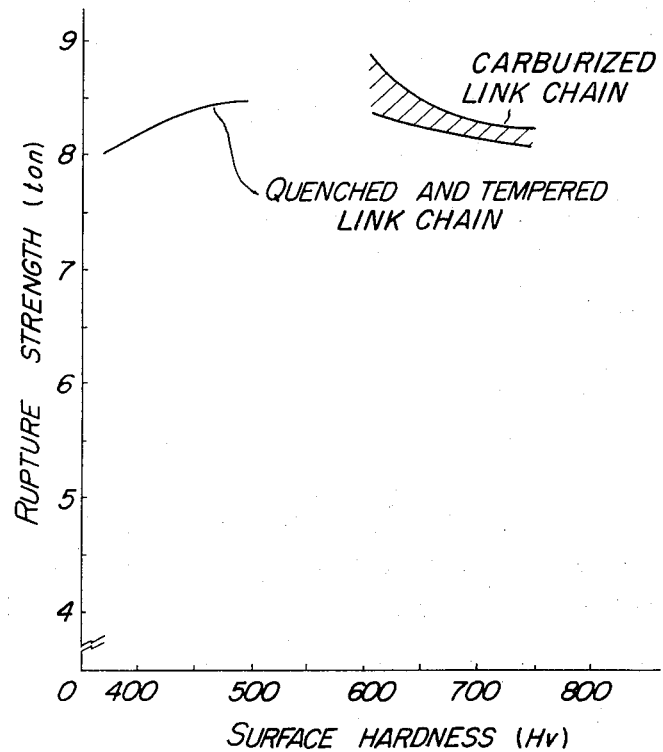
FIG. 2 is a graph showing the relationship between the surface hardness and the rupture strength of the embodiments of the invention.

A quenched and tempered link chain (the diameter of the unit link-constituting steel rod was 8 mm) was made of low manganese steel consisting of 0.23 percent by weight of C, 0.12 percent by weight of Si, 1.30 percent by weight of Mn, 0.015 percent by weight of P, 0.014 percent by weight of S and the remainder of Fe, quenched at 850° C and tempered in a temperature range of 100°–200° C. Separately, a link chain (the diameter of the unit link-constituting steel rod was 8 mm) was made of steel consisting of 0.23 percent by weight of C, 0.21 percent by weight of Si, 0.78 percent by weight of Mn, 0.009 percent by weight of P, 0.010 percent by weight of S, 0.29 percent by weight of Ni, 0.25 percent by weight of Cr, 0.19 percent by weight of Mo and the remainder of Fe, subjected to a gas-carburization at an elevated temperature for a suitable period of time, quenched in oil at 60° C to obtain 0.5–0.8 percent by weight of carbon concentration in the carburized surface layer, and tempered in oil at 200° C for 30 minutes. The surface hardness and the rupture strength of each link chain were measured to determined the relationship therebetween, and plotted into a curve as shown in the chart of FIG. 2.

In the chart, the area with a denotation "case-hardened link chain" shows the range of fluctuation of the surface hardness when the carbon concentration varies from 0.6 to 0.8 percent by weight, and it may be construed that, for the same rupture strength, the line on the smaller hardness side represents the measured surface hardness of the link chain of which the carbon concentration of the carburized surface layer is 0.6 percent by weight and the line on the larger hardness side represents the measured surface hardness of the link chain of which the carbon concentration of the carburized surface layer is 0.8 percent by weight.

From the chart, it will be seen that the quenched and tempered link chain has a rupture strength greater than 8 tons but is poor in wear-resistance as the surface hardness thereof is Hv 500 at highest. On the other hand, the case-hardened link chain containing Ni, Cr and Mo has a surface hardness of as high as Hv 600–750 and a rupture strength of as large as greater than 8 tons. Thus, it was confirmed that the link chain according to the invention has excellent properties.

Example 2

A carburized link chain (the diameter of the unit link-constituting steel rod was 8 mm) was made of steel consisting of 0.15 percent by weight of C, 0.26 percent by weight of Si, 1.28 percent by weight of Mn, 0.015 percent by weight of P, 0.010 percent by weight of S, 0.64 percent by weight of Ni, 0.88 percent by weight of Cr, 0.51 percent by weight of Mo and the remainder of Fe, subjected to a gas-carburization at 850° C for 40 minutes, quenched in oil at 60° C to obtain 0.75 percent by weight of carbon concentration in the carburized surface layer and 0.2 mm of depth of said layer, and tempered in oil at 170° C for 30 minutes. Separately, a quenched and tempered link chain (the diameter of the unit link-constituting steel rod was 8 mm) was made of low manganese steel consisting of 0.23 percent by weight of C, 0.12 percent by weight of Si, 1.30 percent by weight of Mn, 0.015 percent by weight of P, 0.014 percent by weight of S and the remainder of Fe, quenched from 850° C and tempered at 150° C. Each of the link chains was incorporated in a motor block for hoisting a structure having a weight of 1 ton, and the amount of wear of the internal length of the unit link was measured with respect to the number of contact with the sprocket to determine the relationship therebetween. This test was conducted in a completely dry state of the link chain with no lubricant on the surface thereof, so as to evaluate the performance of the link chain under severe conditions.

FIG. 3 shows a curve representing such relationship. In the chart of FIG. 3, the axis of ordinate is scaled by amount of wear of the internal length of the link and the axis of abscissa is scaled by number of contact with the sprocket. As seen, in case of the conventional quenched and tempered link chain the internal length of the link increased 0.4 mm (5 percent of the initial length) after 100 times of contact and as large as 0.8 mm after 330 times of contact, whereas in case of the case-hardened link chain of the invention the amount of wear of the internal length of the link was about 0.03 mm even after 600 times of contact, providing that the link has very excellent wear resistance. Furthermore, in case of the case-hardened link chain the rate of wear increased very little with an increasing number of times of contact, and the amount of wear was 0.11 mm after 5,000 times of contact. Thereafter, the link was subjected to substantially no wear and the amount of wear was only 0.12 mm even after 10,000 times of contact.

This means that the carburized link chain of the instant invention can be used semi-permanently.

Example 3

The quenched and tempered link chain and the carburized link chain used in Example 1 were individually subjected to a tensile test by repeatedly applying tensile stress at the rate of 2,700 times/minute, and the fatigue strength of the respective link chains after repeated application of the tensile stress of $10^6$ times were measured. Both of the link chains had fatigue strengths ranging from 1.3 to 1.5 tons and proved to have strength characteristic sufficient for use as link chain.

Example 4

A link chain made up of unit links each having a rod diameter of 8 mm and made of a material comprising 0.18 percent by weight of C, 0.16 percent by weight of Si, 0.78 percent by weight of Mn, 0.006 percent by weight of P, 0.013 percent by weight of S, 0.37 percent by weight of Ni, 0.49 percent by weight of Cr and 0.18 percent by weight of Mo and the remainder of Fe was heated for 30 minutes in an appropriate carburizing atmosphere maintained at 870° C, quenched in a salt bath held at 180° C and subjected to a martempering treatment for 2 hours. After the treatment, the carbon concentration in the surface layer of the link was 0.61 percent by weight; the hardness was Hv 640–680 at the carburized surface layer and Hv 470 at the inner layer; and the effective depth of the carburized surface layer was 0.23 mm. The link chain made up of such links had a tensile strength greater than 8.2 tons and a fatigue strength greater than 1.4 tons.

Example 5

Link chains of which the diameter of the unit link-constituting rods is 9.5 mm were made from a Ni-Cr type molten steel consisting of 0.13 percent by weight of C, 0.23 percent by weight of Si, 0.68 percent by weight of Mn, 0.012 percent by weight of P, 0.008 percent by weight of S, 0.62 percent by weight of Ni, 0.47 percent by weight of Cr and the remainder of Fe, and from the steel in which each 0.02 percent by weight of Al and Ti was added for denitriding and then 0.004 percent and 0.008 percent by weight of B were added in the form of Fe-B alloy to the above mentioned molten steel. Each of these link chains was subjected to a gas-carburization at 870° C for 30 minutes in a carburizing atmosphere, quenched in oil at 60° C so as to obtain a carbon concentration of 0.7 percent by weight in the carburized surface layer of the unit links and an effective depth of the carburized surface layer of 0.2 mm, and then tempered in oil at 180° C for 1 hour. The actual effective depth of the curburized surface layer of the unit link was 0.23 mm in case of the link chain made of the material without having B incorporated therein and 0.26 mm in case of the link chains having B incorporated therein. A rupture test was conducted on each link chain to measure the rupture strength and the hardness distribution on the fracture.

As a result, it was found that the link chain without having B incorporated therein had a rupture strength of 9.6 tons but the rupture strength could be substantially increased by the incorporation of B, and the link chain incorporating 0.004 percent by weight of B had a rupture strength of 12.5 tons and the link chain incorporating 0.008 percent by weight of B had a rupture strength of 11.5 tons. The carburized surface layers showed Hv hardnesses ranging from 620 to 700 irrespective of whether B was incorporated or not, but the Hv hardness at the center of the link-constituting steel rod was 380 in case of the link without having no B incorporated therein and 416–423 in case of the links having B incorporated therein, indicating that the inner layer of the link was quench-hardened remarkably by the incorporation of B.

Example 6

Link chains of which the diameter of the unit link-constituting steel rod is 9.5 mm were made from a molten Ni-Cr-Mo type steel consisting of 0.11 percent by weight of C, 0.30 percent by weight of Si, 0.82 percent by weight of Mn, 0.01 percent by weight of P, 0.010 percent by weight of S, 0.58 percent by weight of Ni, 0.48 percent by weight of Cr, 0.19 percent by weight of Mo and the remainder of Fe, and from the same molten steel to which 0.02 percent by weight each of Al and Ti were added for denitriding and then 0.004 percent and 0.008 percent by weight of B were added in the form of Fe-B alloy respectively. Each of the link chains was subjected to a carburizing and tempering under the same conditions as in Example 5, and a rupture test was conducted thereon. As a result, it was found that the link chain without having B had a rupture strength of 10.5 tons but the rupture strength could be increased about 25 percent and to 13.2 tons by the incorporation of 0.004 percent by weight of B and to 11.9 tons by the incorporation of 0.008 percent by weight of B.

Example 7

Link chains of which the diameter of the unit link-constituting rod is 9.5 mm were made from a Ni-Mo type molten steel consisting of 0.13 percent by weight of C, 0.28 percent by weight of Si, 0.70 percent by weight of Mn, 0.010 percent by weight of P, 0.008 percent by weight of S, 1.02 percent by weight of Ni, 0.20 percent by weight of Mo and the remainder of Fe, and from the steel in which 0.02 percent by weight each of Al and Ti was added for denitriding and then 0.004 percent and 0.008 percent by weight of B were added in the form of Fe-B alloy respectively to the above-mentioned molten steel. Each of the link chains was subjected to carburizing and tempering under the same conditions as in Example 5, and a rupture test was conducted thereon. As a result, it was found that the link chain without having B incorporated therein had a rupture strength of 9.7 tons but the rupture strength could be increased about 20 percent, namely, and to 11.8 tons by the incorporation of 0.004 percent by weight of B and further to 12.0 tons by the incorporation of 0.008 percent by weight of B.

We claim:

1. A motor block link chain which is made up of unit links each being untwisted and having a generally rounded opening of such size that meets and meshes with teeth of a sprocket driven by a motor, wherein each of said unit links is made of a length of rod of a steel consisting of 0.10–0.26 percent by weight of C, 0.10–0.35 percent by weight of Si, 0.50–1.40 percent by weight of Mn, 0.2–0.7 percent by weight of Ni, up to 0.01 percent by weight of B, up to 0.035 percent by weight of P, up to 0.035 percent by weight of S, at least one element selected from the group consisting of Cr and Mo, the amounts of Cr and Mo being 0.2–0.9 percent and 0.1–0.5 percent, respectively, and the balance substantially iron, and having a carburized surface layer of a depth of 1/80–1/25 of the diameter of a rod constituting the unit link, wherein the C concentration in said layer is from 0.6 to 0.8 percent by weight, so that said carburized layer has a surface hardness of greater than about Hv 600.

2. A motor block link chain which is made up of unit links each being untwisted and having a generally rounded opening of such size that meets and meshes with teeth of a sprocket driven by a motor, wherein each of said unit links is made of a length of rod of a steel consisting of 0.1–0.26 percent by weight of C, 0.10–0.35 percent by weight of Si, 0.50–1.40 percent by weight of Mn, 0.2–0.7 percent by weight of Ni, 0.2–0.9 percent by weight of Cr, 0.1–0.5 percent by weight of Mo, up to 0.035 percent by weight of P, up to 0.035 percent by weight of S, and the balance substantially iron, and having a carburized surface layer of a depth of 1/80–1/25 of the diameter of a rod constituting the unit link, wherein the C concentration in said layer is from 0.6 to 0.8 percent by weight, so that said carburized layer has a surface hardness of greater than about Hv 600.

3. A motor block link chain which is made up of unit links each being untwisted and having a generally rounded opening of such size that meets and meshes with teeth of a sprocket driven by a motor, wherein each of said unit links is made of a length of rod of a steel consisting of 0.1–0.26 percent by weight of C, 0.10–0.35 percent by weight of Si, 0.50–0.90 percent by weight of Mn, 0.2–0.7 percent by weight of Ni, 0.2–0.9 percent by weight of Cr, 0.001–0.01 percent by weight of B, up to 0.035 percent by weight of P, up to 0.035 percent by weight of S, and the balance substantially iron; and having a carburized surface layer of a depth of 1/80–1/25 of the diameter of a rod constituting the unit link, wherein the C concentration in said layer is from 0.6 to 0.8 percent by weight, so that said carburized layer has a surface hardness of greater than about Hv 600.

4. A motor block link chain which is made up of unit links each being untwisted and having a generally rounded opening of such size that meets and meshes with teeth of a sprocket driven by a motor, wherein each of said unit links is made of a length of rod of a steel consisting of 0.1–0.26 percent by weight of C, 0.10–0.35 percent by weight of Si, 0.50–0.90 percent by weight of Mn, 0.2–0.7 percent by weight of Ni, 0.1–0.5 percent by weight of Mo, 0.001–0.01 percent by weight of B, up to 0.035 percent by weight of P, up to 0.035 percent by weight of S, and the balance substantially iron, and having a carburized surface layer of a depth of 1/80–1/25 of the diameter of a rod constituting the unit link, wherein the C concentration in said layer is from 0.6 to 0.8 percent by weight, so that said carburized layer has a surface hardness of greater than about Hv 600.

5. A link chain according to claim 1, wherein said steel consists essentially of 0.1–0.26 percent by weight of C; 0.10–0.35 percent by weight of Si, 0.50–0.90 percent by weight of Mn, 0.2–0.7 percent by weight of Ni, 0.2–0.9 percent by weight of Cr, 0.1–0.5 percent by weight of Mo, 0.001–0.01 percent by weight of B, up to 0.035 percent by weight of P, up to 0.035 percent by weight of S, the balance substantially iron.

6. A link chain according to claim 1, wherein the carbon concentration of the surface layer is preferably 0.7 percent by weight.

* * * * *